(12) United States Patent
Arneau et al.

(10) Patent No.: US 9,984,577 B2
(45) Date of Patent: May 29, 2018

(54) DEVICE FOR DISPLAYING AND UPDATING TRAJECTORY PATTERNS, IN PARTICULAR SAR TRAJECTORY PATTERNS

(71) Applicant: THALES, Courbevoie (FR)

(72) Inventors: David Arneau, Pessac (FR); Guillaume Dupont, Pessac (FR)

(73) Assignee: THALES, Courbevoie (FR)

( * ) Notice: Subject to any disclaimer, the term of this patent is extended or adjusted under 35 U.S.C. 154(b) by 0 days. days.

(21) Appl. No.: 15/310,064

(22) PCT Filed: May 20, 2015

(86) PCT No.: PCT/EP2015/061068
§ 371 (c)(1),
(2) Date: Nov. 9, 2016

(87) PCT Pub. No.: WO2015/177187
PCT Pub. Date: Nov. 26, 2015

(65) Prior Publication Data
US 2017/0178517 A1    Jun. 22, 2017

(30) Foreign Application Priority Data

May 21, 2014 (FR) ..................... 14 01152

(51) Int. Cl.
*G01C 21/00* (2006.01)
*G08G 5/00* (2006.01)
(52) U.S. Cl.
CPC ......... *G08G 5/0021* (2013.01); *G08G 5/0034* (2013.01); *G08G 5/0039* (2013.01)

(58) Field of Classification Search
CPC ... G08G 5/0021; G08G 5/0034; G08G 5/0039
(Continued)

(56) References Cited

U.S. PATENT DOCUMENTS

| 8,285,427 B2 * | 10/2012 | Rogers | G01C 23/00 340/945 |
| 8,694,184 B1 * | 4/2014 | Boorman | G01C 23/00 340/945 |

(Continued)

FOREIGN PATENT DOCUMENTS

| EP | 2 679 959 A2 | 1/2014 |
| FR | 2 995 422 A1 | 3/2014 |

OTHER PUBLICATIONS

Jean-Pierre Fillion, "rGroupe415-AeroGroupe d'Intervention Multi-role," Jun. 11, 2008, XP055174314 <http://web.archive.org/web/20080611122850/http://www.jpfil.com/415/protocoles/index.php>.

(Continued)

*Primary Examiner* — Ojiako Nwugo
(74) *Attorney, Agent, or Firm* — Baker & Hostetler LLP (57) ABSTRACT

A device comprises display means and means for calculating and memorizing the positions of points forming patterns being capable of being updated by an operator, the position, orientation and the form of a pattern being defined by a set of technical parameters. Each pattern comprises a set of control points, the function of a control point being, by virtue of its movement, to modify at least one technical parameter, a trajectory pattern modification being carried out through an interaction in which the operator moves at least one control point.

19 Claims, 7 Drawing Sheets

(58) Field of Classification Search
USPC .............................................. 340/979; 701/3
See application file for complete search history.

(56) References Cited

U.S. PATENT DOCUMENTS

| | | | |
|---|---|---|---|
| 2011/0199239 A1 | 8/2011 | Lutz et al. | |
| 2012/0257684 A1* | 10/2012 | Vasek | G08G 5/0013 375/259 |
| 2013/0013133 A1* | 1/2013 | Walter | G08G 5/0021 701/11 |
| 2013/0345905 A1* | 12/2013 | Parthasarathy | G01C 23/00 701/3 |
| 2015/0019047 A1* | 1/2015 | Chandrashekarappa | B64D 43/00 701/3 |
| 2016/0019795 A1* | 1/2016 | Chircop | G08G 5/0034 701/7 |

OTHER PUBLICATIONS

George Damani, "Inside the US Coast Guard's SAR Response to a Plane Crash," Mar. 18, 2014, XP055174317 <http://www.nycaviation.com/2014/03/inside-us-coast-guards-sar-response-plane-crash/#.VPh3oG0wVAt>.

Anonymous, "Bulgarian Volunteers Slam SAR Incompetence > Maritime Accident Casebook," Feb. 9, 2010, XP055174320 <http://maritimeaccident.org/2010/02/bulgarian-volunteers-slam-sar-incompetence>.

* cited by examiner

DEVICE FOR DISPLAYING AND UPDATING TRAJECTORY PATTERNS, IN PARTICULAR SAR TRAJECTORY PATTERNS

CROSS-REFERENCE TO RELATED APPLICATIONS

This application is a National Stage of International patent application PCT/EP2015/061068, filed on May 20, 2015, which claims priority to foreign French patent application No. FR 1401152, filed on May 21, 2014, the disclosures of which are incorporated by reference in their entirety.

FIELD OF THE INVENTION

The present invention relates to a device for displaying and updating trajectory patterns, in particular SAR trajectory patterns. The invention ties in to the technical field of civilian or military mission avionics. In particular, it relates to the execution of aircraft-based search and rescue (SAR) missions. The invention may also be applied to seagoing vessels for the same type of mission.

BACKGROUND

In order to find a person or vessel lost at sea or on land, an aircraft must follow a pattern describing a search pattern, or SAR pattern, which will be referred to as a SAR trajectory, or more simply a SAR pattern, hereinafter. The aim of this predetermined trajectory is to optimize the trajectory of the aircraft in order to cover the entire search area. Various trajectory patterns exist depending on the search conditions.

The solutions of the prior art rest on the use of the flight management system, which will be referred to as the FMS hereinafter.

The SAR trajectory patterns form an integral part of the FMS, which is responsible for the aircraft following a programmed trajectory.

However, all technical parameters are manually entered by the pilot, these parameters being, in particular, the position of the entry point of the trajectory, the position of the exit point, the separation between two branches of the trajectory, the width and the length, the azimuth (orientation with respect to north).

In particular, the drawbacks of these solutions are:

time wasted by the operator responsible for calculating the technical parameters. Specifically, even with an FMS, these parameters are still calculated manually and these calculations are not simple, since they depend on multiple technical, geographic or environmental parameters such as the geographic area to be covered, the transit time, the altitude of the aircraft, the weather, the sea conditions or the flight speed;

a lack of real-time graphical representation: the operator enters all parameters one by one, then this trajectory is incorporated into the flight management. If this does not visually correspond to the expectations of the operator, the operator must modify the values one by one. This lack of representation leads to wasted time for the operator, who must re-enter a trajectory if he or she considers the latter not to be optimal with respect to the search area;

a lack of direct relationship between the SAR pattern and the current mission. The parameters to be entered for the calculation are technical, generally mathematical, parameters (position, distance, angles, etc.) and are not parameters oriented toward a mission (for example to save a pilot lost after a crash). This leads to wasted time for the operator, who must re-enter a trajectory if he or she considers the latter not to be optimal with respect to the search area;

wasted time for the pilot who must concentrate on flight management rather than on successfully accomplishing the mission;

the calculation of the trajectories does not take environmental parameters, such as current drift or wind strength for a SAR at sea, into account;

lastly, these technical parameters have to be entered manually, which leads to wasted time for an operator.

It is therefore apparent that the cognitive load linked to the operations is substantial and takes up a lot of the operator's time. He or she must, in particular, estimate the orientation and form of the SAR trajectory pattern, and anticipate sea currents and other environmental parameters. However, during a search and rescue mission, the "time" parameter is very important, the operator having to act quickly to maximize the chance of mission success.

SUMMARY OF THE INVENTION

An aim of the invention is, in particular, to overcome the aforementioned drawbacks. To this end, a subject of the invention is a device for displaying trajectory patterns, said patterns being capable of being updated by an operator, the position, orientation and the form of a pattern being defined by a set of technical parameters, said device comprising at least display means and means for calculating and memorizing the positions of the points forming said patterns, each pattern comprising a set of control points, the function of a control point being, by virtue of its movement, to modify at least one technical parameter, a trajectory pattern modification being carried out through an interaction in which the operator moves at least one control point.

In one possible embodiment:

the calculation means comprise at least one pattern data module capable of storing and calculating the positions of the pattern points that are liable to be selected by the operator in order to be displayed;

the display means comprise at least one screen and one cartographic engine detecting the interactions by the operator on the screen and ordering the display of at least one pattern selected using its control points, based on the position calculations provided by the pattern data module.

The calculation means comprise, for example, a utility module whose function is to provide primitives of spherical trigonometry calculations to the pattern data module for calculating the position of the points of the patterns in a planar frame of reference.

Said device comprises, for example, a management module whose function is to interpret the interactions by the operator that are detected by the cartographic engine and to request, from the pattern data module, the modifications to the displayed patterns when an interaction orders the movement of a control point of said pattern, a module displayed on the screen being updated through an interaction by the operator ordering the movement of at least one control point, the cartographic engine providing the new position of said control point to the management module, the data module calculating the new positions of the points of the pattern according to said new position provided by the management module.

Said device comprises, for example, a map database containing digitized maps representing a geographical area intended to be displayed, an attached pattern being superposed onto a geographical area.

The display means comprise, for example, means for selecting a pattern, said selection being carried out through an interaction between the operator and said display means.

In one particular embodiment, the positions of the points of a pattern are calculated such that the movement of a first control point produces a translational movement of the pattern without the other technical parameters of said pattern being modified. The positions of the points of the pattern are calculated, for example, such that the movement of a control point produces a rotation of the pattern around the first control point and modifies the height of the pattern, without the other technical parameters of said pattern being modified. The positions of the points of the pattern are calculated, for example, such that the movement of a control point produces a rotation of the pattern around the first control point and modifies the width of the pattern, without the other technical parameters of said pattern being modified. Said pattern having branches, the movement of a control point produces, for example, a modification in the separation between the branches without the other technical parameters of said pattern being modified.

The display means comprise, for example, an interactive screen, which may be of touchscreen type, potentially taking the form of a tablet.

Said presents possibilities to optimize the technical parameters of a pattern according to external parameters or else according to data arising from sensors.

The calculation means are, for example, embedded within an onboard computer.

Said device being capable of being placed on board an aircraft, it comprises, for example, means for connecting to the internal buses and to the sensors of an aircraft, the display means additionally displaying flight data.

Said device comprises, for example, means for transmitting the patterns to a flight management system (FMS).

The trajectories are, for example, trajectories for search and rescue (SAR) missions.

BRIEF DESCRIPTION OF THE DRAWINGS

Other features and advantages of the invention will become apparent with the aid of the description which follows, given in relation to the appended drawings in which.

DETAILED DESCRIPTION

Figure 1:
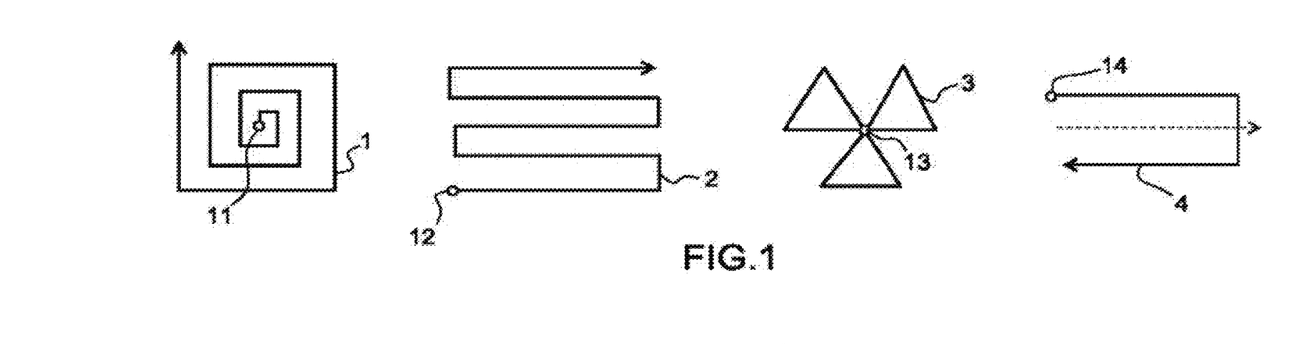
FIG. 1 shows four patterns describing SAR trajectories generally used in the prior art.

FIG. 1 shows four patterns 1, 2, 3, 4 describing SAR trajectories generally used in the prior art. These patterns define search routes to be followed by the aircraft in order to carry out the search. The are used according to the conditions and the nature of the search. These trajectory patterns each have a certain number of technical parameters that have to be adjusted for each mission, starting with the choice of pattern: a pattern 1 in the form of an extended square, a pattern 2 in the form of a ladder, a sectored pattern 3 or a tracking pattern 4, other patterns being possible. In particular, the technical parameters to be adjusted are the following:

the position of the entry point 11, 12, 13, 14, defined by its latitude and longitude;

the position of the exit point;

the width and/or length of the pattern;

the orientation of the pattern, defined by an angle with respect to north.

These parameters must be calculated and entered by the operator in order to maximize coverage of the search area, without automation. This results in a substantial amount of wasted time, which may be detrimental to the mission.

Figure 2:
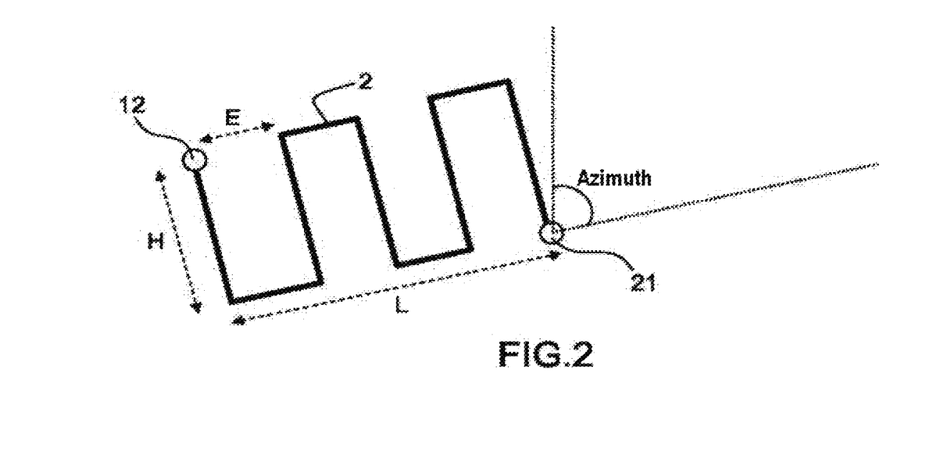
FIG. 2 shows a particular trajectory pattern with its defining technical parameters.

FIG. 2 shows the example of the trajectory pattern in ladder form 2 in which the operator must define multiple technical parameters. In particular, he or she must define the latitude and longitude of the entry point 12 and of the exit point 21 of the trajectory 2, along with the height H, the space E between the "rungs" and the total length L of the ladder pattern. All of these parameters are entered manually.

FIGS. 3a to 3d illustrate the principle of the invention. According to the invention, the control points of the displayed trajectories 1, 2, 3, 4 are defined, and the graphical movement of these control points allows all of the parameterization needs of these trajectories to be met, in particular relating to the position, the associated orientation, spacings, widths and lengths. Advantageously, the movement of a limited number of control points allows all of the technical parameters of a trajectory to be defined. FIGS. 3a to 3d illustrate the case of the parameterization of a trajectory pattern in ladder form of the type of that in FIG. 2, but instead of parameterizing by manually defining every technical parameter, only a few judiciously chosen control points are acted upon.

To this end, the invention requires at least means for displaying the trajectories and their control points and a module for calculating the technical parameters using the data arising from the graphical representation and from the interactions by an operator on the control points. These means for implementing the invention will be described below.

Advantageously, the trajectory pattern may be displayed in real time as a superposition on the map of the theater of operations, thereby improving the real-time graphical representation.

The ladder pattern requires four control points in order to act on all of the technical parameters. A first control point Po allows the trajectory pattern 2 to be moved without its form being changed, the pattern 2 being moved with respect to a map of the theater of operations that is also displayed. A second control point Ph allows the height and orientation of the pattern to be modified. A third control point Pn allows the spacing between the rungs of the pattern, and hence their number, to be modified. Lastly, a fourth control point Pw allows the length and orientation of the pattern to be modified.

By virtue of the parameterization possibilities granted through movements of these control points, the latter may be intuitively manipulated by an operator in order to modify the technical parameters of the pattern. It is therefore possible to quickly and easily adjust the patterns according to the requirements of the mission during their input.

Any interaction means may be envisaged for manipulating the control points on a display screen. These control points may, for example, be guided through touching an interactive screen, a touchscreen tablet for example. In particular, a technique of "drag-and-drop" type may be used.

The control points may also be manipulated using a designation pointer, a mouse for example, on any non-interactive screen.

Figure 3A:
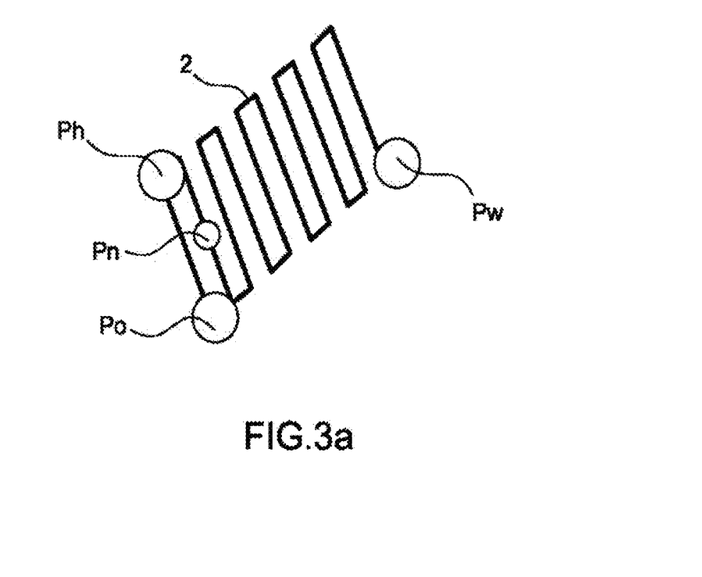
FIGS. 3a to 3d illustrate the principle of the invention.
Figure 3B:
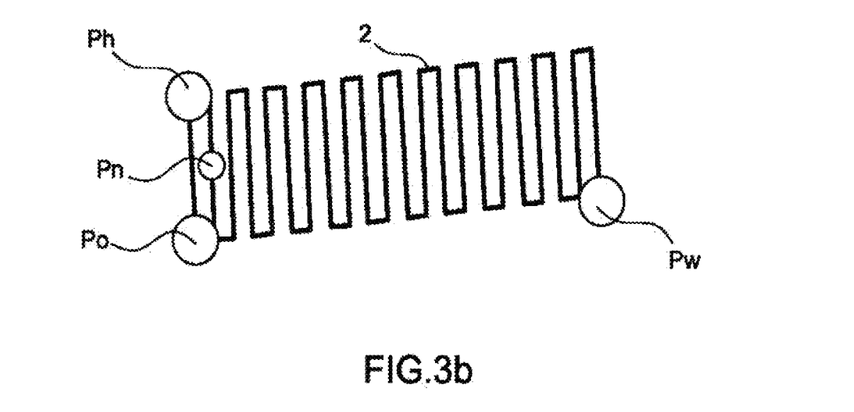
Figure 3C:
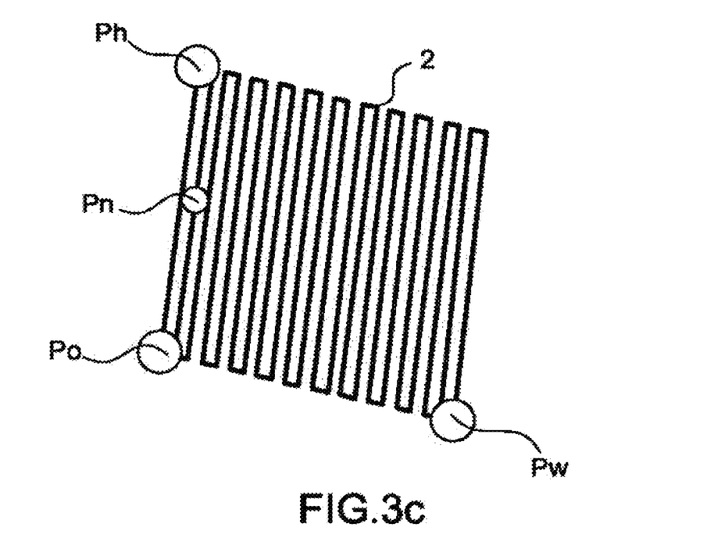
Figure 3D:
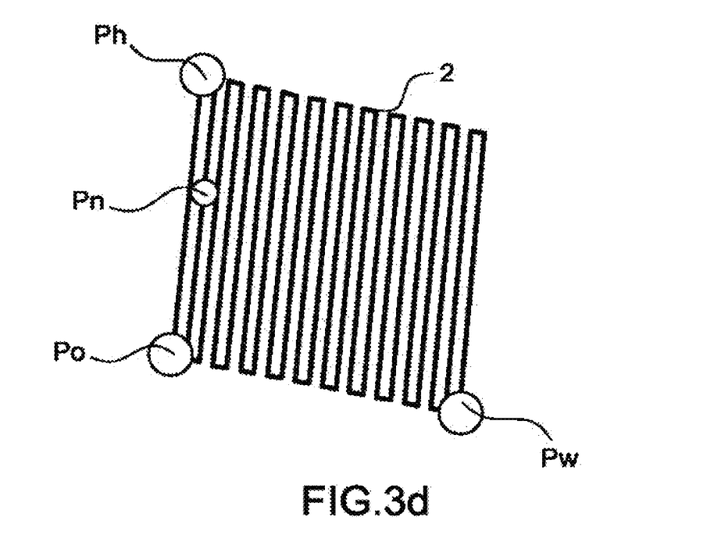

While FIG. 3a shows a starting position, FIGS. 3b, 3c and 3d represent three successive manipulations of the pattern.

In the case of FIG. 3b, the control point Pw has been moved to the right and downward. Subsequent to this manipulation, the pattern 2 is elongated. It has also undergone a rotation of a few degrees in the clockwise direction.

In the case of FIG. 3c, the control point Ph has been moved upward and to the right. As a result, the pattern is vertically stretched. It has also undergone a rotation of a few degrees in the clockwise direction.

In the case of FIG. 3d, the control point Po has been moved. The pattern has then been moved without undergoing a modification of its form, in a translational movement.

The principle according to the invention illustrated by FIGS. 3a to 3d may be applied to any type of pattern, the use of control points allowing the main technical parameters to be automatically adjusted.

Advantageously, a device according to the invention may receive certain mission parameters in order to facilitate inputting the pattern and/or to propose the pattern best suited to the mission. This may also facilitate updating the pattern during the mission, by altering its particular technical parameters. These entry parameters are, for example, the coordinates of a crash site to cover, a last known position of the carrier, a last known movement speed of the carrier or the remaining level of fuel on board, among other possible parameters.

Advantageously, a device according to the invention may comprise connection means to be connected to the avionics buses and to the onboard sensors, and may therefore:
  display the flight plan;
  update the position of the carrier and of the flight plan;
  make proposals for optimizing the technical parameters of the pattern according to external parameters, for example according to the speed of the carrier and meteorological conditions, sea currents in particular;
  make proposals for optimizing the technical parameters of the pattern according to the data arising from the sensors;
  automatically update the flight plan, through an interface with the FMS.

As mentioned above, the cognitive load of the operator is decreased, thereby allowing him or her to concentrate on his or her mission. He or she does not carry out any calculation for modifying or positioning the search trajectory pattern. The calculations for parameterizing the pattern are taken over by the processing means described below, based on the interactions by the operator on the control points.

Figure 4:
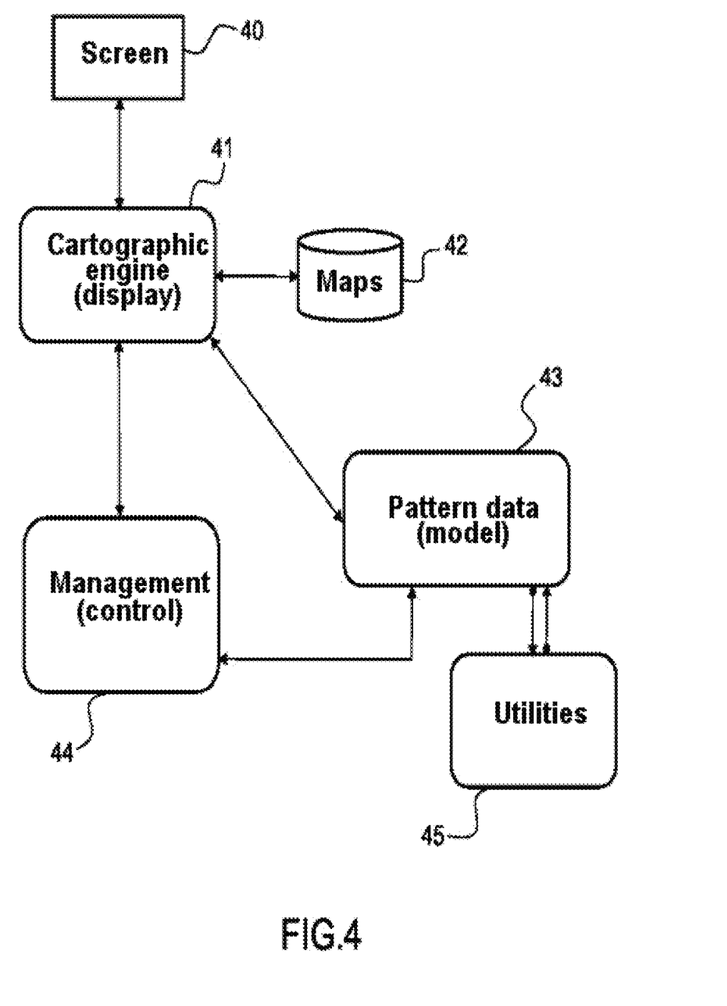
FIG. 4 shows an example of software architecture implementing a device according to the invention.

FIG. 4 illustrates an exemplary software architecture implemented in a device according to the invention, along with a screen 40 for displaying the patterns. In one possible embodiment, a device according to the invention takes the form of a touchscreen tablet, of EFB (electronic flight bag) type for example. The device may also be a PC or any other system combining a screen 40, which may or may not be a touchscreen, with processing means. A device according to the invention proposes a graphical display of the pattern and an HMI (human-machine interface) for control based on control points. The technical parameters of the flight trajectory pattern are then calculated automatically. This calculation is carried out by a calculation module that uses the data arising from the graphical representation on the HMI. This module operates according to the prior art for cartographic engines which allow the geographic position of a point to be retrieved, and employs conventional spherical trigonometry calculations.

To this end, the software architecture of a device, such as shown in FIG. 4, comprises, for example, the following components, this architecture being a conventional architecture of MVC (model-view-controller) type:
  a cartographic engine module 41 responsible for displaying the pattern, displaying the underlying map and the interactions with the user, for example managing the dragging and dropping of the control points or managing mouse clicks;
  a map database 42, containing at least the one or more digitized maps of the search area; along with geographic data and aeronautical data. This database is accessed by the graphics engine which displays the data and maps stored in this database. In another possible embodiment, this database 42 may be external to the device, the digitized maps potentially being downloaded for example;
  a pattern data module 43, capable of storing and updating all of the technical parameters relating to the various patterns manipulated by the operator. For a ladder pattern 2, it stores at least the latitude and longitude of the entry point of the pattern, the latitude and longitude of the exit point, the width and the length of the pattern, the angle of orientation of the pattern and its number of branches;
  a management module 44 whose function is to pick up the interactions by a user or an operator, to interpret them and to request that the data relating to the pattern be updated by the module 43.
  a utility module 45 whose function is to provide primitives of spherical trigonometry calculations, in order to allow the position of all of the points of a pattern in a planar geographic frame of reference to be calculated on the basis of knowledge of the technical parameters of the pattern (entry and exit points, orientation, form elements, etc.). These calculation primitives are delivered to the pattern data module 43 which includes the module for calculating the positions of points of the patterns.

The operating system is not shown in FIG. 4 as it does not interact directly with the components of this figure, in the context of the invention.

In the exemplary embodiment based on a tablet, all of these components are embedded within a tablet. The screen of the tablet, of touchscreen type, displays the trajectory patterns superposed on the underlying map corresponding to the search area.

The architecture and the components of FIG. 4 may also be embedded within an onboard mission computer. The HMI is achieved by means of a screen 40 communicating with this computer, this screen being of touchscreen type for example. A pattern may be modified via a mouse cursor in the case of using a non-touchscreen medium.

An exemplary operation may be carried out according to the following process:
  the operator requests the display of a ladder pattern 2 on the map on the screen by clicking on the place on the map where the trajectory should be displayed. The cartographic engine 41 determines the actual geographic coordinates of the point designated by the operator;
  the various corresponding actions are sent by the cartographic engine 41 to the management module 44, these interactions indicating the pattern to be displayed (a ladder pattern in this example) and the position of the pattern (latitude, longitude). The management module 44 commands the pattern data module 43 to initialize a pattern with data acquired through the interactions by the operator;

the pattern data module 43 updates its data and commands the cartographic engine 41 to display the pattern by calling primitives from the utility module 45 and lists of points;

the cartographic engine module 41 displays the graphic corresponding to the pattern;

the operator drags and drops the control point Po that is at the start of the pattern, the pattern having to undergo a translational movement. The cartographic module 41 interacts with the operator and retrieves the new point Po;

the various corresponding interactions are sent to the management module 44 by the cartographic engine 41, specifying the new position Po of the pattern in terms of latitude and longitude. The management module 44 then commands the pattern data module 43 to modify the pattern with the new point Po as a "longitude, latitude" parameter;

the pattern data module 43 calculates the new points forming the pattern. The utility module 45 may be used for the trigonometry calculations. It updates the data of the pattern and commands the cartographic engine module to display the pattern by calling primitives and a new list of points;

lastly, the cartographic engine module displays the modified graphic corresponding to the pattern, this pattern being displayed as it is until the next interaction on a control point.

All of these interactions are carried out via the control points of the patterns, as described above.

FIGS. 5*a* to 5*d* illustrate the control points for the four exemplary patterns shown in FIG. 1. Multiple control points are defined according to the type of pattern, as mentioned above. For each pattern, the set of these control points allows any possible modifications of these technical parameters, the modifications being carried out by moving the control points. Each control point may be manipulated by the operator, for example through a drag-and-drop operation on the touchscreen of the device.

Figure 5A:
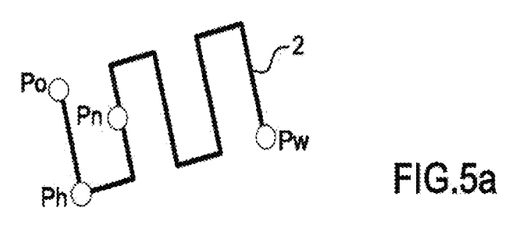
FIGS. 5a to 5d show the control points for the four preceding patterns.

FIG. 5*a* shows the control points for the ladder pattern 2, the latter comprising four control points:

Po: this is the start of the pattern, its entry point. The function of this control point is, through its movement, to move the pattern without modifying its orientation (azimuth), its width or its height: only its position changes;

Ph: the function of Ph is, through its movement, to modify the height of the pattern and its orientation without changing the starting point Po, the rotation being carried out about the point Po. The point Ph is, for example, placed on the first branch of the pattern, the end opposite the point Po;

Pn: the function of Pn is, through its movement, to modify the width of each branch, and hence their number. The number of branches is equal to the integer part of the result of dividing the width of the pattern by the width of a branch. If necessary, the system adds a last branch in order to finish the pattern. This point Pn is, for example, located on one of the branches parallel to the first branch;

Pw: the function of Pw is, through its movement, to modify the width of the pattern and its orientation without changing the starting point Po, the rotation being carried out about the point Po. The point Pw is, for example, located at the exit of the pattern.

Figure 5B:
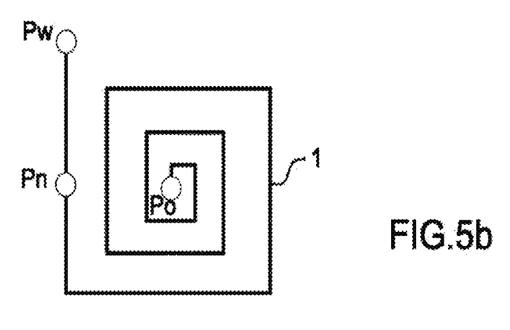

FIG. 5*b* shows the control points for the extended square pattern 1:

Po: this is the start of the pattern, the entry point in the middle of the square. This control point allows the pattern to be moved without modifying its orientation (azimuth), its width or its height: only its position changes;

Pn: Pn allows the width of each branch, and hence their number, to be modified. This point is, for example, located on the last branch of the square before exiting the trajectory;

Pw: Pw allows the width and height of the pattern and its orientation to be modified without changing the starting point Po (the rotation is carried out about the point Po). This point Pw is, for example, located at the exit of the pattern.

Figure 5C:
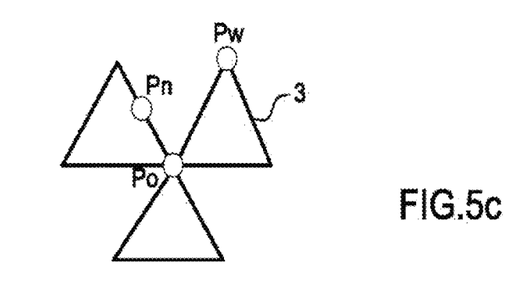

FIG. 5*c* shows the control points for the sectored pattern 3:

Po: this is the start of the pattern, placed in the center of the triangular sectors. This control point allows the pattern to be moved without modifying its orientation (azimuth), its width or its height: only its position changes;

Pn: Pn allows the width of each sector, and hence their number, to be modified. This point Pn is, for example, located on one side of a sector;

Pw: Pw allows the width and height of the pattern and its orientation to be modified without changing the starting point Po (the rotation is carried out about the point Po). This point Pw is, for example, located on a vertex of a sector.

Figure 5D:
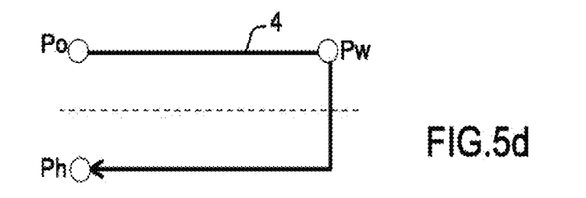

FIG. 5*d* shows the points for the tracking pattern 4:

Po: this is the start of the pattern, its entry point. This control point allows the pattern to be moved without modifying its orientation (azimuth), its width or its height: only its position changes;

Ph: Ph allows the height of the pattern and its orientation to be modified without changing the starting point Po (the rotation is carried out about the point Po). This point Ph is, for example, located at the exit of the pattern;

Pw: Pw allows the length of the pattern and its orientation to be modified without changing the starting point Po (the rotation is carried out about the point Po). This point Pw is, for example, located on one of the angles of the pattern.

The above principles may be applied to other forms of patterns. More generally, the invention is applicable to all forms of patterns that may be defined by a set of technical parameters.

FIGS. 6*a* to 6*d* illustrate the use of the control points on the screen of a device according to the invention. More particularly, these figures illustrate the operation of the control points for the ladder pattern 2, the use being identical for all other patterns. In these figures, the pattern 2 shown with solid lines is in its starting position. The pattern 2' shown with dashed lines is the same pattern, but modified subsequent to an interaction on one of the control points. The pattern 2, 2' is superposed on an underlying map corresponding to a search area. An arrow 60 illustrates the movement of a finger 61 dragging and dropping a control point on the touchscreen.

Figure 6A:
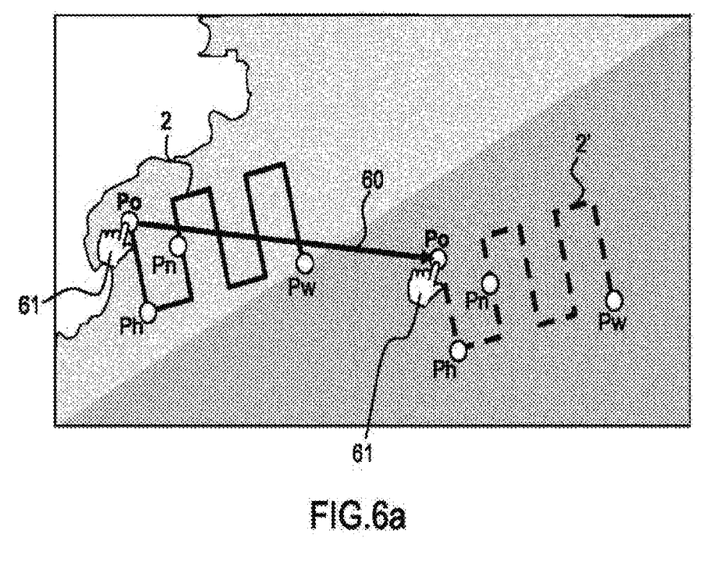
FIGS. 6a to 6d illustrate control points for a particular trajectory pattern.

FIG. 6*a* illustrates the dragging and dropping of the control point Po. This movement produces a translational movement of the pattern. In this example, the pattern is moved to the right. The orientation and the form of the pattern are retained.

Figure 6B:
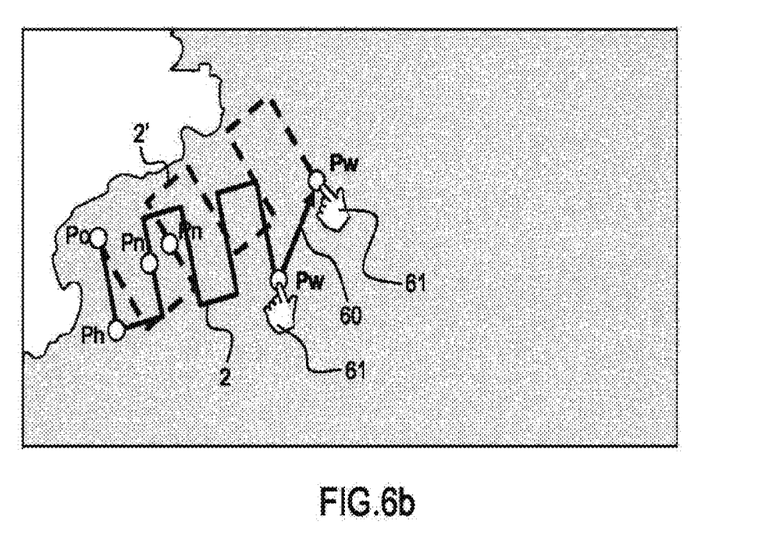

FIG. 6*b* illustrates the dragging and dropping of the control point Pw. This movement produces an increase or a decrease in the size of the pattern, along with a rotation thereof. The starting point Po of the pattern does not move.

The rotation is carried out about this point. In this example, the size of the pattern is increased.

Figure 6C:
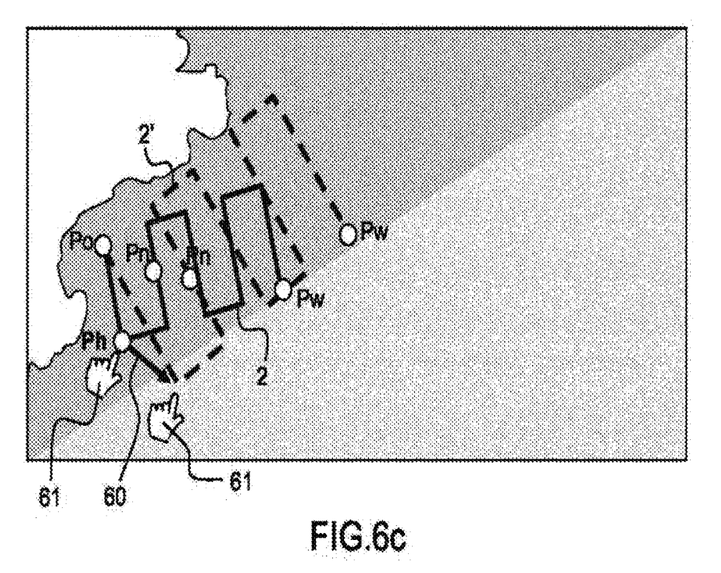

FIG. 6c illustrates the dragging and dropping of the control point Ph. This movement produces an increase in the size of the pattern in terms of height, along with a rotation. The starting point Po of the pattern does not move, the rotation being carried out about this point.

Figure 6D:
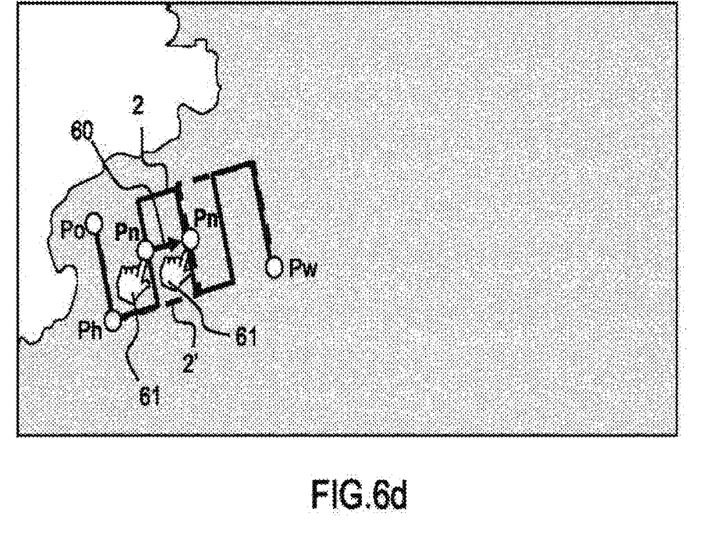

FIG. 6d illustrates the dragging and dropping of the control point Pn. This movement produces an increase or a decrease in the width of the branches, thereby causing a decrease or an increase in the number of branches, respectively. In this example, the width of the branches has been increased and, as a consequence, the number of branches has decreased.

The invention has been described for the displaying and updating of SAR trajectory patterns. It may also be applied to other patterns describing other types of trajectories.

The invention claimed is:

1. A device for displaying trajectory patterns, said trajectory patterns being configured to be updated by an operator, a position, an orientation and a form of a trajectory pattern being defined by a set of technical parameters, comprising:
at least display means; and
means for calculating and memorizing positions of points forming said trajectory patterns, each trajectory pattern comprising a set of control points, a function of a control point being, by virtue of its movement, to modify at least one technical parameter, a trajectory pattern modification being carried out through an interaction in which the operator moves at least one control point.

2. The device as claimed in claim 1, wherein:
the calculation means comprise at least one pattern data module configured to store and calculate the positions of the pattern points that are liable to be selected by the operator in order to be displayed;
the display means comprise at least one screen and one cartographic engine detecting the interactions by the operator on the screen and ordering a display of at least one trajectory pattern selected using its control points, based on position calculations provided by the pattern data module.

3. The device as claimed in claim 2, wherein the device is configured to provide primitives of spherical trigonometry calculations to the pattern data module for calculating the position of the points of the trajectory patterns in a planar frame of reference.

4. The device as claimed in claim 2, comprising a management module configured to function so as to interpret the interactions by the operator that are detected by the cartographic engine and to request, from the pattern data module, the modifications to the displayed trajectory patterns when an interaction orders the movement of a control point of said trajectory pattern, a module displayed on the screen being updated through an interaction by the operator ordering the movement of at least one control point, the cartographic engine providing a new position of said control point to the management module, the data module calculating new positions of the points of the trajectory pattern according to said new position provided by the management module.

5. The device as claimed in claim 1, comprising a map database containing digitized maps representing a geographical area intended to be displayed, an attached trajectory pattern being superposed onto a geographical area.

6. The device as claimed in claim 1, wherein the display means comprise means for selecting a trajectory pattern, said selection being carried out through an interaction between the operator and said display means.

7. The device as claimed in claim 1, wherein the positions of the points of a trajectory pattern are calculated such that the movement of a first control point produces a translational movement of the trajectory pattern without the other technical parameters of said trajectory pattern being modified.

8. The device as claimed in claim 7, wherein the positions of the points of the trajectory pattern are calculated such that the movement of a control point produces a rotation of the trajectory pattern around the first control point and modifies a the height of the trajectory pattern, without the other technical parameters of said trajectory pattern being modified.

9. The device as claimed in claim 7, wherein the positions of the points of the trajectory pattern are calculated such that the movement of a control point produces a rotation of the trajectory pattern around the first control point and modifies a width of the trajectory pattern, without the other technical parameters of said trajectory pattern being modified.

10. The device as claimed in claim 7, wherein, the trajectory pattern comprises branches, the movement of a control point produces a modification in a separation between the branches without the other technical parameters of said trajectory pattern being modified.

11. The device as claimed in claim 1, wherein the display means comprise an interactive screen.

12. The device as claimed in claim 11, wherein the screen is a touchscreen.

13. The device as claimed in claim 12, wherein the device is implemented in a form of a tablet.

14. The device as claimed in claim 1, wherein the calculation means are embedded within an onboard computer.

15. The device as claimed in claim 1, wherein the device is configured to present possibilities to optimize the technical parameters of a trajectory pattern according to external parameters.

16. The device as claimed in claim 1, wherein the device is configured to present possibilities to optimize the technical parameters of a trajectory pattern according to data arising from sensors.

17. The device as claimed in claim 1, wherein the device is configured to be placed on board an aircraft, the device further comprises means for connecting to internal buses and to sensors of an aircraft, the display means additionally displaying flight data.

18. The device as claimed in claim 17, comprising means for transmitting the trajectory patterns to a flight management system.

19. The device as claimed in claim 1, wherein the trajectories are trajectories for search and rescue missions.

* * * * *